United States Patent
Migl et al.

(10) Patent No.: US 11,746,697 B2
(45) Date of Patent: Sep. 5, 2023

(54) GAS TURBINE COMPRISING THERMAL ENERGY STORE, METHOD FOR OPERATING SAME, AND METHOD FOR MODIFYING SAME

(71) Applicant: Siemens Energy Global GmbH & Co. KG, Bayern (DE)

(72) Inventors: Matthias Migl, Munich (DE); Ronald Schwarz, Bamberg (DE); Denis Tschetschik, Bubenreuth (DE)

(73) Assignee: Siemens Energy Global GmbH & Co. KG, Bayern (DE)

( * ) Notice: Subject to any disclaimer, the term of this patent is extended or adjusted under 35 U.S.C. 154(b) by 0 days.

(21) Appl. No.: 17/626,922

(22) PCT Filed: Apr. 2, 2020

(86) PCT No.: PCT/EP2020/059430
§ 371 (c)(1),
(2) Date: Jan. 13, 2022

(87) PCT Pub. No.: WO2021/013389
PCT Pub. Date: Jan. 28, 2021

(65) Prior Publication Data
US 2022/0275755 A1 Sep. 1, 2022

(30) Foreign Application Priority Data

Jul. 19, 2019 (DE) ............... 10 2019 210 737.0

(51) Int. Cl.
*F02C 6/18* (2006.01)
*F01K 17/02* (2006.01)

(52) U.S. Cl.
CPC ............. *F02C 6/18* (2013.01); *F01K 17/025* (2013.01); *F05D 2220/64* (2013.01); *F05D 2220/76* (2013.01)

(58) Field of Classification Search
CPC ...... F01K 17/025; F01K 23/10; F01K 23/101; F01K 23/106; F01K 23/108; F01K 23/14;
(Continued)

(56) References Cited

U.S. PATENT DOCUMENTS 4,094,148 A * 6/1978 Nelson ................. F01K 3/18
60/659
8,938,966 B2 * 1/2015 Jockenhoevel ......... F02C 6/14
60/659
(Continued)

FOREIGN PATENT DOCUMENTS

DE 102013016077 A1 4/2015
EP 2574755 A2 4/2013
(Continued)

OTHER PUBLICATIONS

PCT International Search Report and Written Opinion of International Searching Authority dated Jul. 3, 2020 corresponding to PCT International Application No. PCT/EP2020/059430 filed Apr. 2, 2020.

*Primary Examiner* — Mickey H France
(74) *Attorney, Agent, or Firm* — WOLTER VAN DYKE DAVIS, PLLC

(57) ABSTRACT

An energy generation plant in which the exhaust gas from a gas turbine is guided into a thermal energy store, wherein the thermal energy store can be used for various purposes. The energy generation plant has at least one gas turbine having an exhaust gas apparatus, at least one generator, at least one thermal energy store, wherein the generator can be driven by the gas turbine, wherein the hot exhaust gas from the gas turbine is passed directly to a thermal energy store via the exhaust gas apparatus, wherein the thermal energy from the thermal energy store can be used to generate power.

23 Claims, 4 Drawing Sheets

(58) Field of Classification Search
CPC .. F01K 23/06–14; F01K 21/047; F02C 1/007; F02C 6/14; F02C 6/18; F05D 2220/72; F05D 2220/64; F28D 20/00–028; F28D 2020/0004–0095; Y02E 60/14
USPC .............................................. 60/659, 39.182
See application file for complete search history.

(56) References Cited

U.S. PATENT DOCUMENTS

| | | | |
|---|---|---|---|
| 2009/0121495 A1* | 5/2009 | Mills ...................... | F01K 23/10 60/659 |
| 2012/0067057 A1 | 3/2012 | Hofmann et al. | |
| 2012/0102950 A1* | 5/2012 | Turchi ................... | F01K 23/10 60/641.15 |
| 2013/0081395 A1* | 4/2013 | Frey ......................... | F02C 6/14 60/671 |
| 2014/0202157 A1 | 7/2014 | Shinnar et al. | |
| 2015/0167551 A1 | 6/2015 | Lenk et al. | |
| 2015/0267566 A1 | 9/2015 | Vamvas | |
| 2016/0319746 A1* | 11/2016 | Kraft ....................... | F02C 7/10 |
| 2018/0156076 A1* | 6/2018 | Becker .................... | F01K 23/10 |

FOREIGN PATENT DOCUMENTS

| | | |
|---|---|---|
| EP | 2674592 A1 | 12/2013 |
| JP | S59138730 A | 8/1984 |

* cited by examiner

GAS TURBINE COMPRISING THERMAL ENERGY STORE, METHOD FOR OPERATING SAME, AND METHOD FOR MODIFYING SAME

CROSS REFERENCE TO RELATED APPLICATIONS

This application is the US National Stage of International Application No. PCT/EP2020/059430 filed 2 Apr. 2020, and claims the benefit thereof. The International Application claims the benefit of German Application No. DE 10 2019 210 737.0 filed 19 Jul. 2019. All of the applications are incorporated by reference herein in their entirety.

FIELD OF INVENTION

The invention relates to a plant in which the exhaust gas from a gas turbine is guided into a thermal energy store, wherein the thermal energy store can be used for various purposes.

BACKGROUND OF INVENTION

In the current energy market, gas turbines are often used as so-called "peakers" and must therefore be started up and shut down quickly in terms of their power. This is not possible from the quiescent state and allowing the gas turbine to continue to run does not appear to be useful either.

SUMMARY OF INVENTION

Therefore, the object of the invention is to solve the problem mentioned above.

The object is achieved by means of a plant, a method for operating a plant, and a modifying method as claimed.

DETAILED DESCRIPTION OF INVENTION

Figure 1:
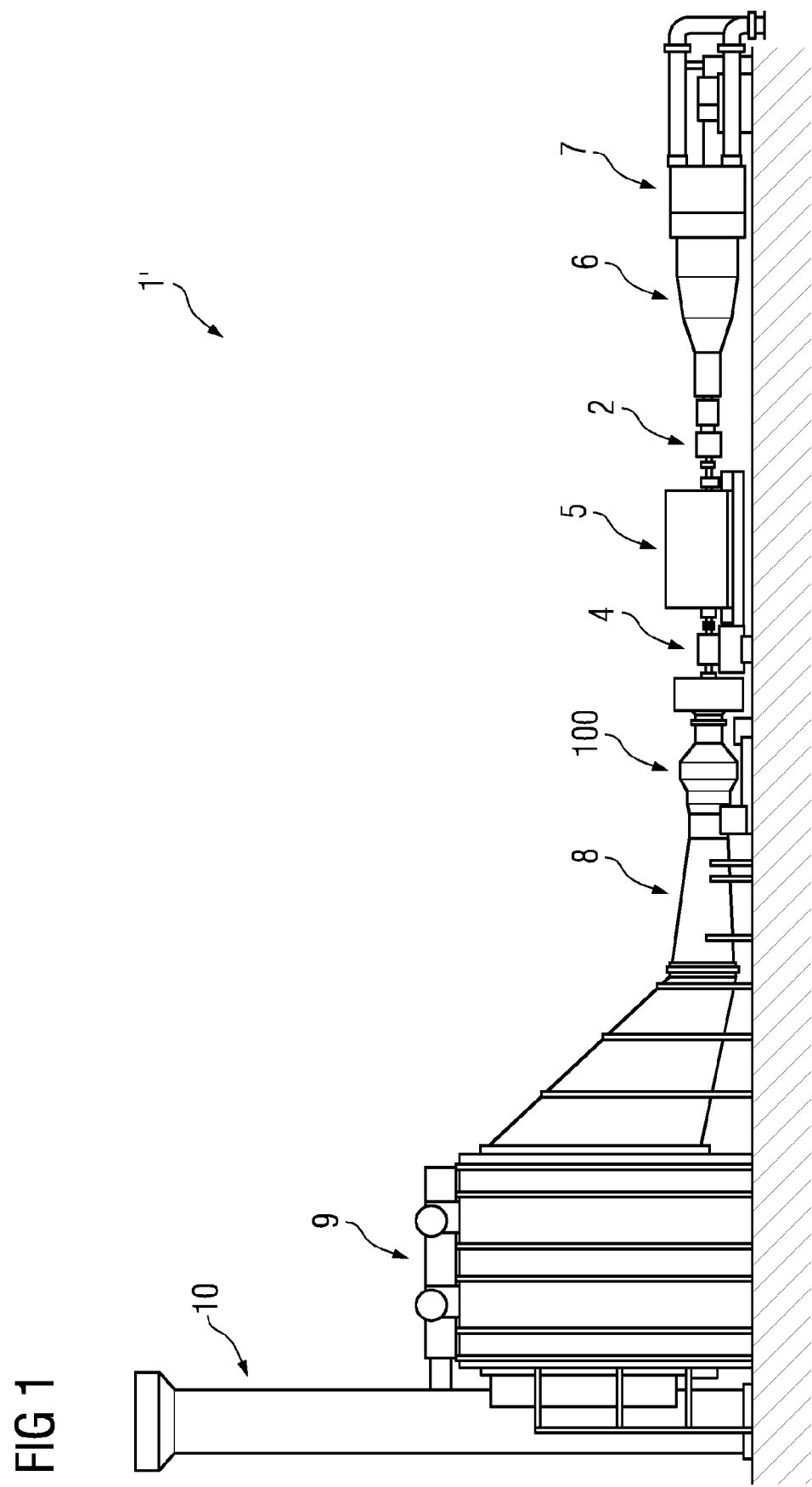
FIG. 1 shows a combined-cycle plant according to the prior art.

The drawing and the description represent only exemplary embodiments of the invention.

FIG. 1 shows, by way of example, an energy conversion plant 1'. A gas turbine 100 is coupled to a generator 5 for generating power via a transmission 4 or a coupling 4.

The generator 5 is likewise connected to a steam turbine 6 via a coupling 2.

Steam turbines 6 are present when it is a combined-cycle power plant. An energy conversion plant 1 may also only have a gas turbine 100 without a steam turbine 6.

A condenser 7 is connected to the steam turbine 6, if present.

The exhaust gas from the gas turbine 100 flows, via an exhaust gas apparatus or via a diffuser 8, into a heat recovery plant (HRSG) 9 in which the hot exhaust air is used to generate steam. An exhaust air chimney 10 is likewise present.

Figure 2:
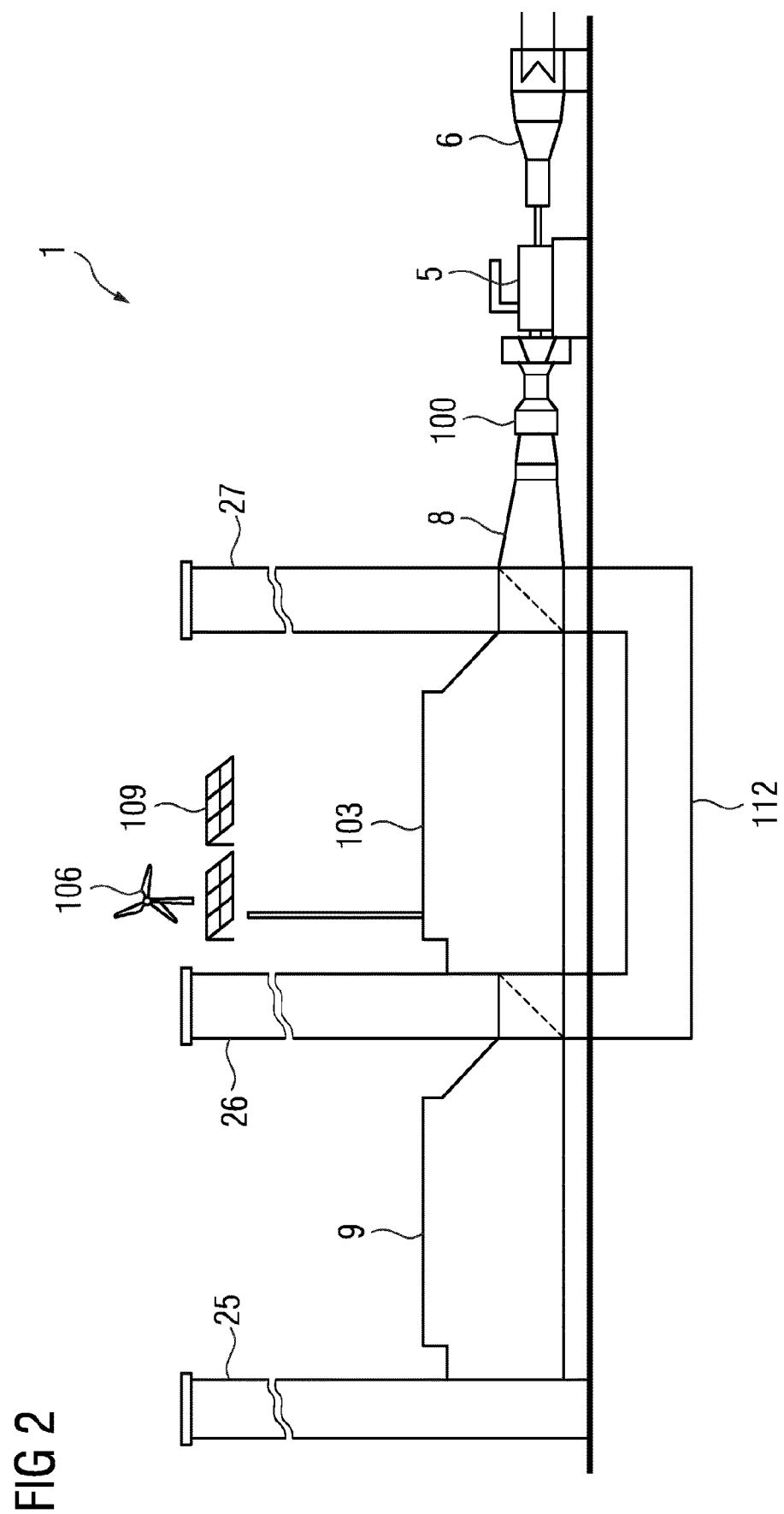
FIGS. 2, 3 and 4 schematically illustrate the invention.

FIG. 2 schematically illustrates a plant 1 according to the invention.

The hot exhaust gas from the gas turbine 100 is guided into an energy store 103 via the diffuser 8.

If necessary, the energy from the energy store 103 can be taken in order to heat water for district heating and to feed it into the district heating system or, like in this example here, it is used to generate steam for a combined-cycle plant.

Optionally, power from renewable energy from wind power plants 106 or solar energy plants 109 can also be supplied to the thermal energy store 103, in particular by means of an electrical heater 36.

Depending on the application, in particular in the case of the combined-cycle plant, there is a bypass 112 which either guides the hot exhaust gas from the gas turbine 100 directly into the thermal energy store 103 or into the heat recovery system (HRSG) 9.

In the present case, chimneys 25, 26, 27 are also provided, wherein the chimney 25 is assigned to the heat recovery system 9, the chimney 26 is assigned to the energy store 103 and the chimney 27 is assigned to the bypass 112.

If the gas turbine 100 is operated at full load and its energy is needed to drive the generator 5, all or most of the exhaust gas from the gas turbine is guided directly into the thermal energy store 103.

During combined-cycle operation, the hot exhaust gas from the gas turbine 100 can be guided into the HRSG 9 and/or into the thermal energy store 103, depending on the network utilization.

If less electricity is needed in the network, the gas turbine 100 can be shut down to a particular extent. In this case, the thermal energy store 103 need not be loaded any further.

If necessary, the thermal energy store 103 is discharged in order to operate the steam turbine 6 which then in turn drives the generator 5 or keeps the boiler warm.

If the gas turbine is operated as a "peaker" or is operated in the open cycle, wherein this may be a single gas turbine or a gas turbine in a combined-cycle plant 1, the hot exhaust gas from the gas turbine 100 is mainly or completely used to load the thermal energy store 103.

Figure 3:
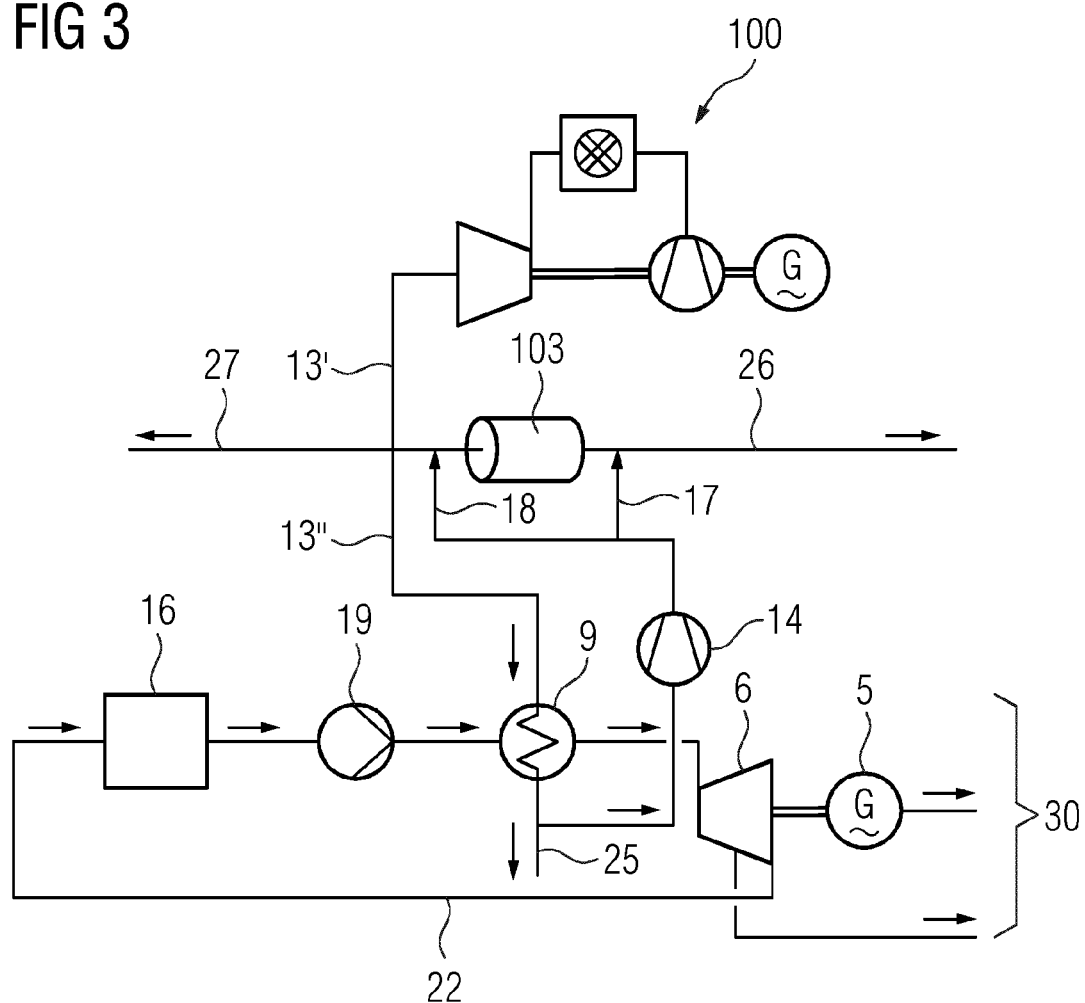

As means 9, a steam turbine 6 and upstream processes can be used, as shown in FIG. 3, to use the stored energy in the energy store 103 to generate electricity.

FIG. 3 shows a detailed arrangement of the plant 1 according to the invention.

The gas turbine 100 which is operated in the open cycle or simple cycle or combined-cycle operation is shown in the upper region. The hot exhaust gas from the gas turbine 100 can be supplied to the thermal energy store 103 via the line 13'. The energy store 103 advantageously has, as storage material, temperature-stable stones with a high heat density or ceramic materials. The storage material defines a multiplicity of gas channels through which the hot exhaust gas can flow. The storage medium is provided, on the outside, with an insulation which can be produced, for example, from fire bricks or the like. The insulation should be designed such that the temperature on the outside does not exceed 60°. The exhaust gas temperature and the exhaust gas mass flow while loading the energy store 103 depend on the type of gas turbine used. In the case of Siemens gas turbine of the type 2000E, the exhaust gas temperature is approximately 550° C., for example, and the exhaust gas mass flow is approximately 560 kg/s and, in the case of a Siemens gas turbine of the type 4000 F, the exhaust gas temperature is approximately 605° C. and the exhaust gas mass flow is 650 kg/s. The storage medium of the energy store 103 and its gas channels should be configured in such a manner that, during loading, a maximum permissible counterpressure, which could jeopardize the proper method of operation of the gas turbine 100, is not exceeded. The energy may likewise be taken from the thermal energy store 103 in the form of hot air in order to guide it to a means 6, 9, 30 for the purpose of generating power. For this purpose, the hot air is guided from the energy store 103 via a discharge line 13" in order to generate hot steam for a steam turbine 6, which drives a generator 5, in the present case by means of a condenser 16, a pump 19 and a heat recovery plant 9 (heat exchanger). In the present case, a fan 14 is used to guide the hot air from the energy store 103 or to discharge the energy store 103, which fan is connected to one side of the energy store 103 via a supply line 17 and is connected to another side of the energy store 103, to which the discharge line 13" is also connected, via a bypass line 18. If cold air is applied to the energy store 103 using the fan 14 via the supply line 17, the hot air stored in the energy store 103 emerges on the other side of the energy store 103 and the discharge line 13" is initiated. In order to reduce the temperature of the hot air leaving the energy store 103, it can be mixed, if necessary, with an adjustable or controllable mass flow of cold air which is supplied via the bypass line 18. In the present case, the fan 14 is designed such that it generates a mass flow of approximately 350 kg/s.

It is likewise possible to use the energy from the thermal energy store 103 to heat water when using refrigeration machines, expansion machines, process heat for drying plants or for district heating by coupling out the energy via one of the chimneys 25, 26, 27.

Figure 4:
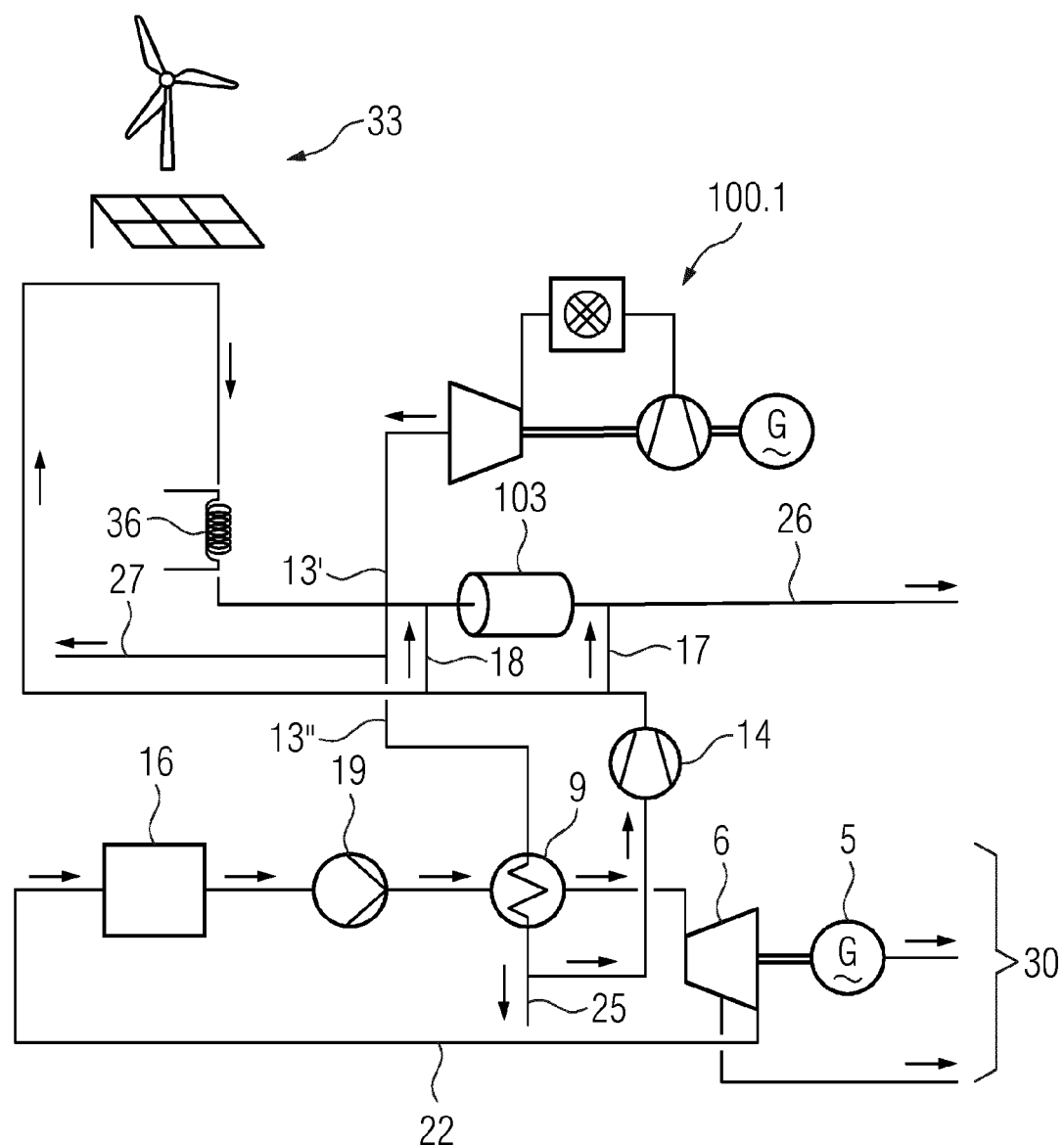

FIG. 4 shows a further variant in which, in supplementation of FIG. 3, renewable energies such as wind energy, solar energy or electricity from reservoirs 23 are used to heat the thermal energy store 103 by means of an electrical heater 36, optionally to heat exhaust gas.

The part of the gas turbine 100 or combined-cycle plant 1 is only schematically illustrated in FIG. 3 and FIG. 4 and corresponds to FIG. 1 or 2.

The thermal energy store 103 advantageously has a modular structure. Individual modules can be heated separately from one another and can therefore be brought to different temperatures.

High temperatures in the energy store 103 are thermodynamically best.

If a module reaches the highest temperature, another module can be heated.

Accordingly, the module with the highest temperature is "discharged" first in order to use it for the steam turbine 6 or HRSG 9, in particular.

The invention claimed is:

1. An energy generation plant, comprising:
a gas turbine comprising an exhaust gas apparatus,
a generator,
a thermal energy store,
wherein the generator is adapted to be driven by the gas turbine,
wherein hot exhaust gas from the gas turbine is adapted to be passed directly to the thermal energy store via the exhaust gas apparatus,
a power generating apparatus for using thermal energy from the thermal energy store to generate power, and
a circuit configured to receive air from the thermal energy store that has been cooled in the power generating apparatus into cold air, to deliver the cold air to the thermal energy store, to heat the cold air into heated air in the thermal energy store, and to return the heated air to the power generating apparatus.

2. The plant as claimed in claim 1,
wherein the plant does not use any power from renewable energies, from wind, from hydro energy, from solar energy, to heat the thermal energy store.

3. The plant as claimed in claim 1,
wherein the plant is adapted to use power from wind and/or hydro energy and/or solar energy to heat the thermal energy store, in particular by means of an electrical heater.

4. The plant as claimed in claim 1,
wherein the plant does not use solar energy to heat air or other working fluids.

5. The plant as claimed in claim 1,
wherein the plant is adapted to use superfluous power from an external power supply system to heat the thermal energy store, in particular by means of an electrical heater.

6. The plant as claimed in claim 1, further comprising:
in addition to the gas turbine, a steam turbine which is adapted to also drive the generator, wherein the thermal energy store is adapted to be used to operate the steam turbine.

7. The plant as claimed in claim 1, further comprising:
a heat recovery system, into which the hot exhaust gas from the gas turbine or steam from a steam turbine can pass.

8. The plant as claimed in claim 1, further comprising:
a bypass between the exhaust gas apparatus of the gas turbine and the thermal energy store, which bypass makes it possible to selectively guide the hot exhaust gas from the gas turbine into the thermal energy store and/or into a heat recovery system.

9. The plant as claimed in claim 1,
wherein the thermal energy store comprises a modular structure in order to heat the thermal energy store differently in individual modules.

10. The plant as claimed in claim 1,
wherein the thermal energy store is discharged via a fan in the circuit which supplies the cold air to the thermal energy store via a supply line of the circuit in such a manner that hot air is pushed from the thermal energy store, wherein the hot air leaving the thermal energy store is selectively mixable with a controllable mass flow of the cold air which is supplied via the fan through a bypass line, wherein the bypass line is connected to the circuit downstream of the fan with respect to a direction of travel of the cold air in the circuit, and wherein the bypass line bypasses the thermal energy store and joins with the circuit downstream of the thermal energy store with respect to a direction of flow of the heated air in the circuit.

11. The plant as claimed in claim 1,
which comprises a single generator for the gas turbine and a steam turbine in the form of a single-shaft plant.

12. The plant as claimed in claim 7,
wherein solar energy is not used to heat air or compress air, not for the heat recovery system, the gas turbine, nor the thermal energy store.

13. The plant as claimed in claim 1, wherein the hot exhaust gas from the gas turbine is adapted to be passed directly through the thermal energy store in a first direction, and wherein the circuit is configured to heat the cold air into the heated air by passing the cold air through the thermal energy store in a second direction that is different than the first direction.

14. A method for operating an energy generation plant, at least comprising a gas turbine comprising an exhaust gas apparatus, a generator, and a thermal energy store, the method comprising:

driving the generator by the gas turbine, guiding hot exhaust gas from the gas turbine via the exhaust gas apparatus directly into the thermal energy store, using only the hot exhaust gas from the gas turbine to heat the thermal energy store, using thermal energy from the thermal energy store at least to generate power via a power generating apparatus, and receiving air from the thermal energy store that has been cooled in the power generating apparatus into cold air, delivering the cold air to the thermal energy store, heating the cold air into heated air in the thermal energy store, and returning the heated air to the power generating apparatus.

15. The method as claimed in claim 14, wherein the plant is a combined-cycle plant with a steam turbine and the thermal energy store, and wherein the thermal energy from the thermal energy store is used to operate the steam turbine.

16. The method as claimed in claim 14, wherein the hot exhaust gas from the gas turbine is selectively redirected into the thermal energy store or into a heat recovery system by means of a bypass.

17. The method as claimed in claim 14, wherein the thermal energy store is discharged using a fan which pushes hot air from the thermal energy store, wherein the hot air leaving the thermal energy store can be mixed with a controllable mass flow of cold air.

18. The method as claimed in claim 15, wherein electricity from solar, hydro and/or wind energy is used to additionally heat up the thermal energy store by means of an electrical heater.

19. The method as claimed in claim 15, wherein the gas turbine is operated in an open cycle.

20. The method as claimed in claim 15, wherein the gas turbine is operated in combined-cycle operation.

21. The method as claimed in claim 15, wherein only the steam turbine in the combined-cycle plant is operated by means of the thermal energy from the thermal energy store.

22. The method as claimed in claim 16, wherein solar energy is not used to heat air or compress air, not for the heat recovery system, the gas turbine, nor the thermal energy store.

23. A method for modifying an existing energy generation plant, the method comprising:

adding a thermal energy store configured to be heated by hot exhaust gas from a gas turbine of the existing energy generation plant; and adding a circuit configured to receive air from the thermal energy store that has been cooled in a power generating apparatus of the existing energy generation plant into cold air, to deliver the cold air to the thermal energy store, to heat the cold air into heated air in the thermal energy store, and to return the heated air to the power generating apparatus.

* * * * *